United States Patent [19]
Yamazaki et al.

[11] Patent Number: 6,091,929
[45] Date of Patent: Jul. 18, 2000

[54] IMAGE FORMING APPARATUS HAVING STAPLING POSITION CONTROLLER

[75] Inventors: Hirohiko Yamazaki; Akihiko Oda; Koichi Kitamoto; Kazuhiro Hirota; Masaki Kakutani, all of Hachioji, Japan

[73] Assignee: Konica Corporation, Tokyo, Japan

[21] Appl. No.: 09/178,984

[22] Filed: Oct. 26, 1998

[30] Foreign Application Priority Data

Oct. 29, 1997 [JP] Japan ................................ 9-297242

[51] Int. Cl.⁷ .................................................. G03G 15/00
[52] U.S. Cl. ............................................................. 399/410
[58] Field of Search .................................. 399/410, 407, 399/81, 82; 270/37; 358/300, 444, 448

[56] References Cited

U.S. PATENT DOCUMENTS

| | | | |
|---|---|---|---|
| 4,763,167 | 8/1988 | Watanabe et al. | 347/155 |
| 5,461,459 | 10/1995 | Muramatsu et al. . | |
| 5,481,354 | 1/1996 | Nakajima | 399/371 |
| 5,508,798 | 4/1996 | Yamada | 399/410 |
| 5,602,651 | 2/1997 | Tabata et al. . | |
| 5,722,031 | 2/1998 | Fujii et al. | 399/410 |
| 5,724,641 | 3/1998 | Shojo et al. | 399/410 |
| 5,774,232 | 6/1998 | Tabata et al. | 358/448 |
| 5,895,142 | 4/1999 | Takahashi et al. | 399/85 |

FOREIGN PATENT DOCUMENTS 0 505 968 A2  9/1992  European Pat. Off. .

OTHER PUBLICATIONS

Patent Abstracts of Japan, vol. 1997, No. 03, Mar. 31, 1997 (1997–03–31) and JP 08–307654 A (CANON INC.), Nov. 22, 1996 (1996–11–22) –Abstract.

*Primary Examiner*—Robert Beatty
*Attorney, Agent, or Firm*—Frishaf, Holtz, Goodman, Langer & Chick, P.C.

[57] ABSTRACT

In an image forming apparatus provided with an image reader to read an image on an image surface of a document and to output image data corresponding to the image; an image processor to process the image data; an image forming device to successively form images on sheets on the basis of the processed image data; there are further provided a post processing device having a stapling stand on which the sheets are placed and a stapler to staple at a predetermined position on the stapling stand, wherein the predetermined position locates at only a single side of the sheet placed on the stapling stand; and a stapling position selector to select a stapling position on the image formed on the sheets, wherein the image processor processes the image data so that when the sheets are placed on the stapling stand, the stapling position on the image formed on the sheets selected by the stapling position selector coincides with the predetermined position on the stapling stand.

7 Claims, 14 Drawing Sheets

IMAGE FORMING APPARATUS HAVING STAPLING POSITION CONTROLLER

BACKGROUND OF THE INVENTION

The present invention relates to an image forming apparatus, and in further detail, relates to an image forming apparatus provided with a post processing means (finisher)by which stapling processing is conducted.

When a plurality of documents are image formed in an image forming apparatus such as a copier, copied sheets may be arranged in order for each copy volume and stapled (stapling processed) by a stapler.

In such a case, a post processing means (finisher) is arranged adjacent to the image forming apparatus, and transfer sheet materials delivered from the image forming apparatus are received by the finisher, and stapling processed by the finisher.

In such stapling processing, any of 4 corners of the documents is designated in 1-position stapling (corner stapling), and any of 4 sides of the document is designated in 2-position stapling (lateral stapling).

In order to meet such variable designation of the stapling position, it is necessary that the finisher is structured so that stapling processing can be conducted at any of 4 corners or 4 sides of the transfer sheet material. That is, in the finisher which meets stapling processing at only one corner or one side (a single end portion), the customer can not necessarily designate their desired stapling position.

In order to conduct stapling processing at any of 4 corners or 4 sides of the transfer sheet material, there is a problem that the structure of the staple mechanism becomes more complicated, and the stapling device becomes more expensive.

With respect to selection of a position of a document placed on an automatic document reading means (ADF) at which stapling is to be conducted, conventionally, there is no image forming apparatus which enables variable selection to be easily grasped visually and conducted.

SUMMARY OF THE INVENTION

In view of the problem described above, the first object of the present invention is to realize an image forming apparatus having a simple structure by which stapling processing can be conducted at any of 4 corners or 4 sides of a transfer sheet material.

That is, the present invention has been achieved to solve the problem described above, and is structured as follows:

(1) An image forming apparatus has an image processing means for image processing the read image data; an image forming means for forming an image onto the transfer sheet material based on the image processed image data; a post processing means having a function to staple at only one of single end portions of the transfer sheet material; and a stapling position-selecting means for selecting a stapling position on the transfer sheet material, and the image processing means conducts image processing so that the single end portion, at which the post processing means staples, coincides with the selected stapling position.

Herein, the above noted image processing in which the single end portion, at which the post processing means staples, coincides with the selected stapling position, means that, by adjusting the direction of the image on the transfer sheet material, the selected stapling position is adjusted to a position at which the post processing means staples.

That is, the orientation of an image transferred on a transfer sheet is changed so as to coincide a stapling position selected by the stapling position-selecting means with single end portions at which the post processing means staples, whereby a stapling operation can staple at any position on four corners or four sides of the transfer sheet even with the post processing means having a simple stapling mechanism adapted to staple at only the single end section of a transfer sheet.

In the present invention, the image processing means conducts image processing so that a stapling position on the transfer sheet material selected by the stapling positionselecting means coincides with a position at which the post processing means can staple (at only one of single end portions of the transfer sheet material).

As a result, the stapling processing can be conducted at any position of 4 corners or 4 sides of the transfer sheet material by a simple structure in which the post processing means staples at only one of single end portions of the transfer sheet material.

(2) An image forming apparatus has an image processing means for image processing the read image data; an image forming means for forming an image onto the transfer sheet material based on the image processed image data; a post processing means provided with a function to staple at only one of single end portions; and a stapling position-selecting means for selecting a stapling position on the transfer sheet material, and the image processing means conducts image rotation processing by 180 degree rotation so that a single end portion at which the post processing means staples, coincides with the selected stapling position.

In this invention, the image processing means conducts the image rotation processing of 180 degree rotation so that the stapling position on the transfer sheet material selected by the stapling position-selecting means coincides with a position at which the post processing means can staple (only one of single end portions of the transfer sheet material).

That is, by adjusting the direction of the image on the transfer sheet material by the image rotation processing of 180 degree rotation, the selected stapling position on the transfer sheet material is adjusted to the stapling position by a post processing means.

As the result, the post processing means can conduct stapling processing at any position of 4 corners or 4 sides of the transfer sheet material by a simple structure to staple at only one of single end portions of the transfer sheet material.

(3) An image forming apparatus has an image processing means for image processing the read image data; an image forming means for forming an image onto the transfer sheet material based on the image processed image data; a post processing means provided with a function to staple at only one of single end portions; and a stapling position-selecting means for selecting a stapling position on the transfer sheet material; and a control means for controlling the direction of the transfer sheet material supplied to the image forming means, and the image processing means conducts image rotation processing of +90 degree rotation or −90 degree rotation so that a single end portion at which the post processing means staples, coincides with the selected stapling position, and the control means controls so that the transfer sheet material having a direction different by 90 degree from the direction of the document is supplied in the case of the image rotation processing of the −90 degree rotation and +90 degree rotation in the image processing means.

In this invention, the image processing of either of the −90 degree rotation or +90 degree rotation is conducted so that the stapling position on the transfer sheet material selected by the stapling position-selecting means coincides with a position at which the post processing means can staple (only one of single end portions of the transfer sheet material). In this connection, in the case of the image rotation processing of the −90 degree rotation and the +90 degree rotation, the control means supplies the transfer sheet material whose direction is different by 90 degree from the direction of the document, to the image forming means.

That is, by adjusting the direction of the image on the transfer sheet material by such the image rotation processing and the transfer sheet material supply control, the stapling position of the selected transfer sheet material is adjusted to coincide with the position at which the post processing means staples.

As a result, the post processing means can conduct stapling processing at any position of 4 corners or 4 sides of the transfer sheet material by a simple structure in which stapling processing is conducted at only one of single end portions of the transfer sheet material.

(4) An image forming apparatus has an image processing means for image processing the read image data; an image forming means for forming an image onto the transfer sheet material based on the image processed image data; a post processing means provided with a function to staple at only one of single end portions; and a stapling position-selecting means for selecting a stapling position on the transfer sheet material; and a control means for controlling the direction of the transfer sheet material supplied to the image forming means, and the image processing means conducts image rotation processing of 180 degree rotation, +90 degree rotation or −90 degree rotation so that a single end portion at which the post processing means staples, coincides with the selected stapling position, and the control means controls so that the transfer sheet material having a direction different by 90 degree from the direction of the document is supplied in the case of the image rotation processing of the −90 degree rotation and +90 degree rotation in the image processing means, and so that the transfer sheet material whose direction is the same as that of the document is supplied in the case of the image rotation processing of the 180 degree rotation.

In this invention, the image rotation processing of any of the −90 degree rotation, +90 degree rotation, and 180 degree rotation is conducted so that the stapling position on the transfer sheet material selected by the stapling positionselecting means coincides with a position at which the post processing means can staple (only one of single end portions of the transfer sheet material). In this connection, the control means supplies the transfer sheet material having a direction different by 90 degree from the direction of the document, to the image forming means, in the case of the image rotation processing of the −90 degree rotation and +90 degree rotation.

That is, by adjusting the direction of the image on the transfer sheet material by such the image rotation processing and the transfer sheet material supply control, the stapling position of the selected transfer sheet material is adjusted to coincide with the position at which the post processing means staples.

As a result, the post processing means can conduct stapling processing at any position of 4 corners or 4 sides of the transfer sheet material by a simple structure in which stapling processing is conducted at only one of single end portions of the transfer sheet material.

(5) An image forming apparatus has an image processing means for image processing the read image data; an image forming means for forming an image onto the transfer sheet material based on the image processed image data; a post processing means provided with a function to staple at only one of single end portions; and a stapling position-selecting means for selecting a stapling position on the transfer sheet material, and the stapling position-selecting means displays a plurality of pictorial symbols each of which displays a desired stapling position on the placed document, and the stapling position is selected by selecting any of the plurality of pictorial symbols.

In this invention, the stapling position-selecting means displays a desired stapling position on the placed document (the sheet direction, the character direction of the document) as choices of a plurality of pictorial symbols, and the stapling position is selected by selecting any of the plurality of pictorial symbols.

According to the above description, relating to the choice at which position stapling is conducted on the document placed on the automatic document reading means, the stapling position can be easily grasped visually and selected by visually comparing the document with the display of pictorial symbols.

DETAILED DESCRIPTION OF THE PREFERRED EMBODIMENT

Figure 1:
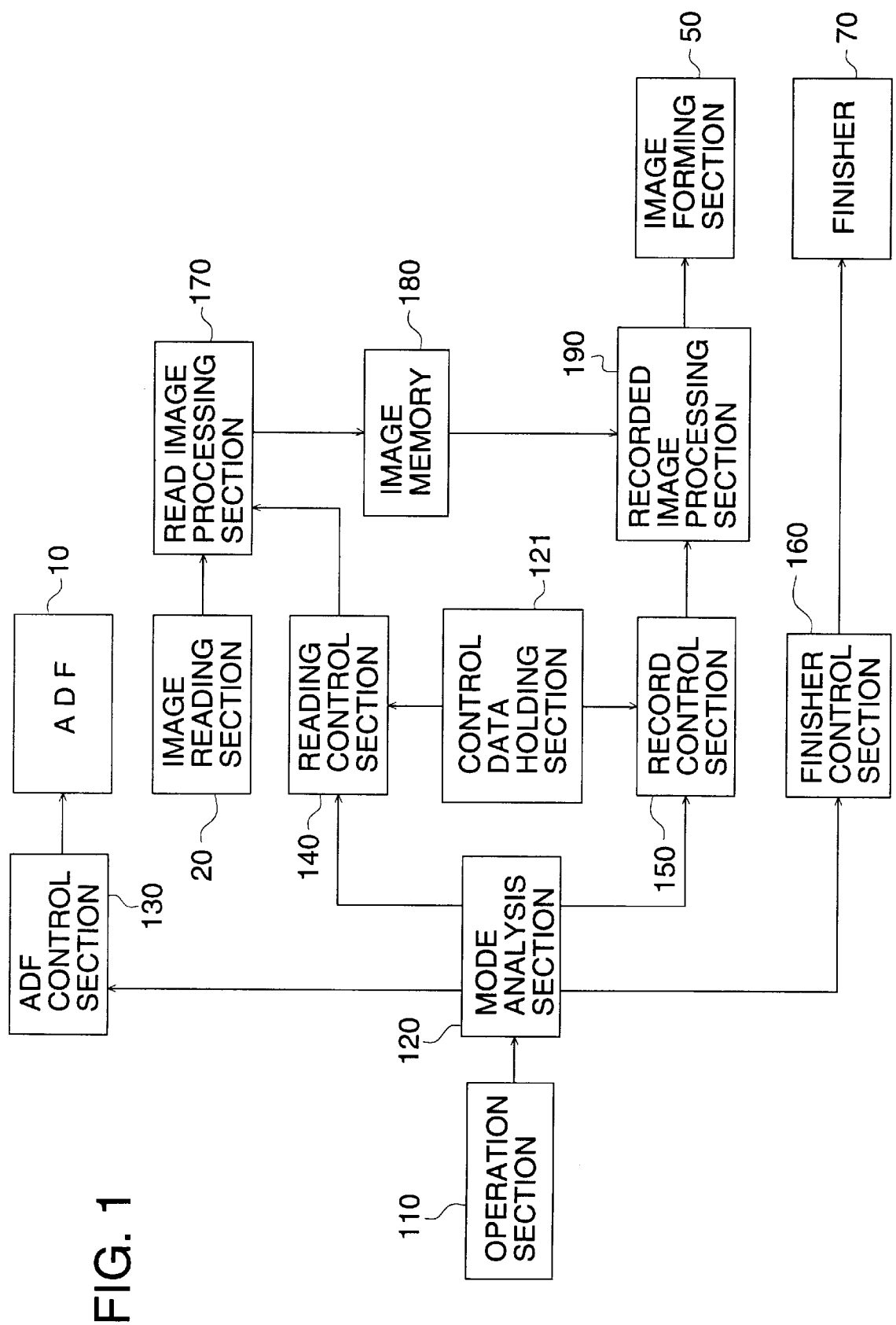
FIG. 1 is a functional block diagram showing an electrical structure of an image forming apparatus of an embodiment of the present invention.

Referring to the drawings, examples of the present invention will be detailed below.

FIG. 1 is a block diagram showing an example of an electrical structure of an image forming apparatus of an example of the present invention. In FIG. 1, numeral 10 is an automatic document feeding means (hereinafter, referred to as ADF), and is a means to automatically feed the two-sides of the placed document to an image reading section (which will be described later). Numeral 20 is an image reading section to read the document and to generate image data. Numeral 50 is an image forming section to record the read image data onto a transfer sheet material p. Numeral 70 is a finisher as a post processing means, which conducts sorting or stapling processing.

Numeral 110 is an operation section to select or designate the number of copy sheets, magnification or reduction ratio, type of transfer sheet materials (A4, A4R, B5, B5R), numeral 120 is a mode analysis section to determine an operation mode by analyzing the selection or designation operation from the operation section 110, and numeral 121 is a control data holding section to hold the control data required at the time of reading control or recording control.

Numeral 130 is an ADF control section to control the operation of the ADF, numeral 140 is a reading control section to control the image processing of the document read out after receiving the result of analysis of the mode analysis section 120, and numeral 150 is a recording control section to conduct recording-control after receiving the result of the analysis of the mode analysis section 120.

Numeral 160 is a finisher control section to control the finisher 70 by receiving the result of analysis of the mode analysis section 120.

Numeral 170 is a reading image processing section to process the image read by receiving the image data from the image reading section 20, numeral 180 is an image memory to store the image processed by the reading image processing section 170, numeral 190 is a recording image processing section to image-process the image read from the image memory 180 for recording (image formation).

Figure 2:
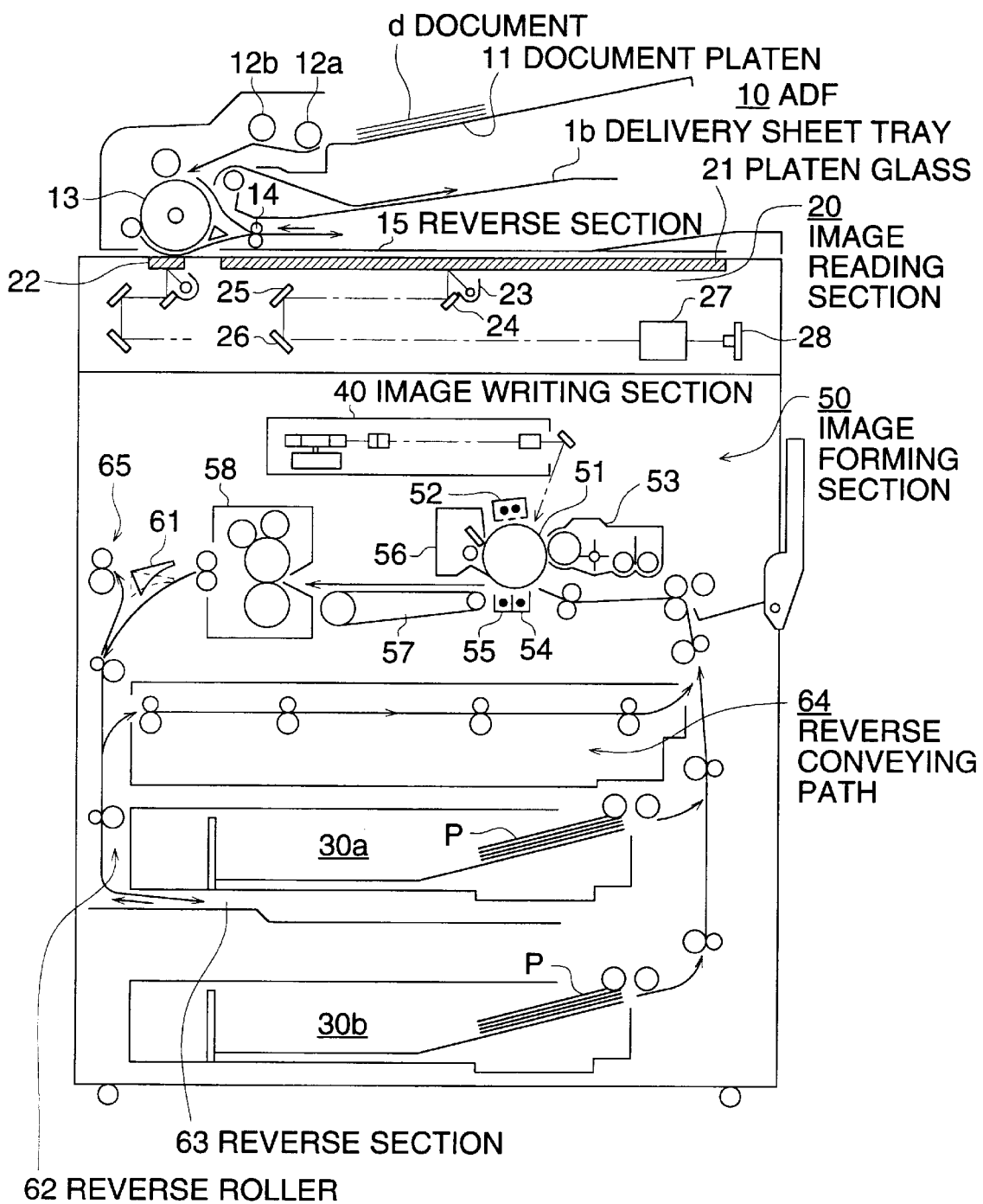
FIG. 2 is a structural view showing a mechanical structure of an image forming apparatus of an embodiment of the present invention.

FIG. 2 is a structural view showing a sectional structure of a copier of the present invention. In FIG. 2, a plurality of document sheets d having the leading page with its surface facing upward are placed on the document platen 11 of the ADF which can read two-sides of the document. The first page of the document sent through rollers 12a and 12b, is rotated by a roller 13.

In that time, the document surface of the document d is irradiated by a light source 23, and its reflected light forms an image on the light receiving surface of a CCD 28, which is a photo-electric conversion means, through mirrors 24, 25, 26 and an image forming optical system 27. Herein, an optical system having the light source 23, mirrors 24, 25, 26, the image forming optical system 27 and the CCD 28, and an optical system driving means, not shown, constitute the image reading section 20.

In FIG. 2, when the document d is placed on the platen glass 21 with its reading surface facing downward, the optical system scans along the platen glass 21 for reading the document image.

Further, when the document d is automatically fed and moves around the roller 13, the light source 23 and the mirror 24 are fixed below the second platen glass 22, and read the document image. Then, thus read image data of the document d is sent from the CCD 28 to the reading image processing section 170, not shown.

In this connection, in the case where the document d is automatically fed by the ADF 10, when the first page of the document d is read, then the winding operation using again the roller 13 is carried out through reversing rollers 14, and an image on the reverse surface of the document is read by the image reading section 20 and sent to the reading image processing section 170.

Thus, the document d in which images on the obverse and reverse surfaces are read, is reversed again by the reversing roller 14, and is stacked with its obverse surface facing downward on the delivery sheet tray 16.

The image data thus read in the image reading section 20 is subjected to predetermined image processing in the reading image processing section 170, and then, stored in the image memory 180.

On the other hand, the transfer sheet material p is sent from a sheet feed cassette 30a or 30b, in which transfer sheets (transfer sheet materials) are stacked, to the image forming section 50. The transfer sheet material p sent to the image forming section 50, is in timed relationship with a photoreceptor drum 51 by register rollers provided at the entry of the image forming section, and then, comes closer to the photoreceptor drum 51.

In APS (automatic paper selector), the size of document is detected when the documents are placed, when the documents are conveyed, or when images on the documents are read, the size of transfer sheets or recording sheets is determined based on the detected size of the document by calculating the magnification when a reducing magnification or an enlarging magnification is set, a cassette in which the determined size of sheets are stored is selected among plural cassettes, and the determined size of sheets are fed from the selected cassette.

Figure 3:
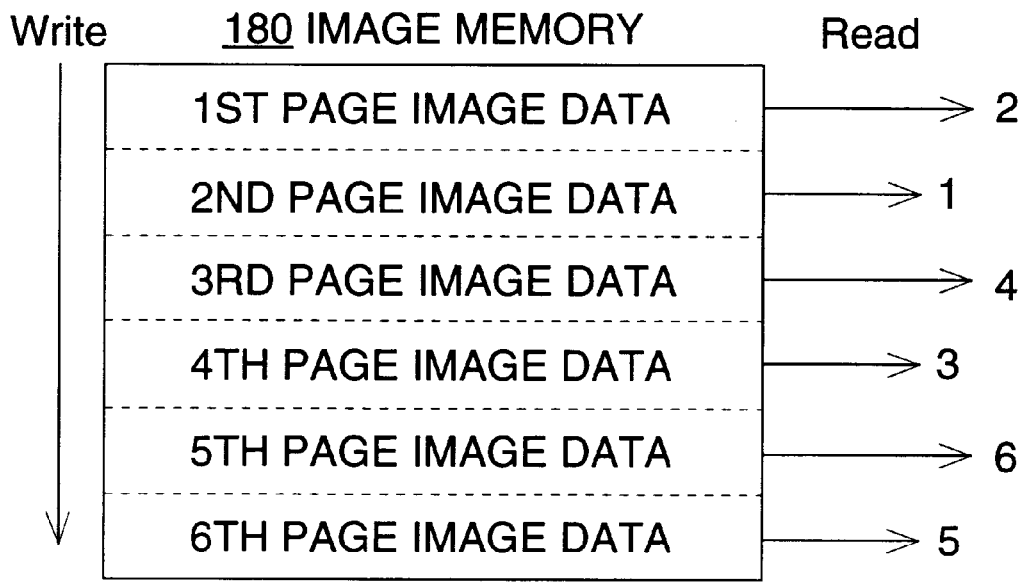
FIG. 3 is an illustration showing an example in the case where the reading sequence is changed, in the sequence of writing into and reading from an image memory.

The image data inputted from the recording image processing section 190 to the image writing section 40, is read at first from the reverse surface of each document, as shown in FIG. 3 and succeeding drawings. Then, the laser beam corresponding to the image data is irradiated on the photoreceptor drum 51 from a laser diode provided in the image writing section 40, and forms an electrostatic latent image. When the electrostatic latent image is developed in the developing section 53, a toner image is formed on the photoreceptor drum 51.

The toner image is transferred onto the transfer sheet material p by a transfer section 54 provided under the photoreceptor drum 51. Then, the transfer sheet material p in pressure-contact with the photoreceptor drum 51, is separated from the photoreceptor drum 51 by a separation section 55. The transfer sheet material p separated from the photoreceptor drum 51 enters into a fixing section 58 through a conveyance mechanism 57, and the toner image is fixed by heat and pressure. Thus, the reverse surface image (the second page image) is formed on the transfer sheet material p.

The transfer sheet material p on which the toner image is fixed, is conveyed downward through a guide 61, and enters into a reverse section 63. Next, the transfer sheet material p entered into the reverse section 63 is fed again by a reverse roller 62, and sent again to the image forming section 50 through a reverse conveying path 64. In the image forming section 50 in which image formation of the reverse surface of the document d has been completed, toner adhered to the photoreceptor drum 51 is removed by a cleaning section 56, then, the photoreceptor drum 51 is charged by a charging section 52, and ready for the next image formation.

In this condition, the obverse surface (the surface which is not image-formed yet) is conveyed into the image forming section 50, and the obverse surface image (the first page image) is formed. The transfer sheet material p separated from the photoreceptor drum 51 in the separation section 55, enters again into the fixing section 58 through the conveyance mechanism 57, and is fixed.

The transfer sheet material p in which image formation of the reverse and obverse surfaces has been thus completed, is delivered outside the apparatus (to the finisher, which will be described later) without any additional operation, or after being reversed again in the reverse section 63, by delivery rollers 65.

Herein, relating to writing and reading operations in the image memory 180, referring to FIGS. 3 through 5, the state in which the reading sequence is changed, will be described.

In the ADF 10, reading is conducted in the sequence of the obverse surface of the first sheet of the document, the reverse surface of the first sheet, the obverse surface of the second sheet, the reverse surface of the second sheet, . . . The image data generated by such the reading operation (the first page image data, the second page image data, the third page image data, the fourth page image data, . . . ) is sequentially written into the image memory 180 as shown by Write in the left column in FIG. 3.

Then, as shown by Read in the right column in FIG. 3, the image data is read out in the sequence of the second page image data, the first page image data, the fourth page image data, the third page image data, . . . That is, the image data is read out in the sequence of the reverse surface of the first sheet, the obverse surface of the first sheet, the reverse surface of the second sheet, the obverse surface of the second sheet.

Incidentally, according to the conveyance path length and the size of the transfer sheet material, the following may also be done: images of the reverse surfaces of 3 transfer sheet materials are formed at one time, and then, images of the obverse surfaces of the 3 transfer sheet materials are formed. In this case, as shown in FIG. 4, the image data generated by the reading-out (the first page image data, the second page image data, the third page image data, the fourth page image data, . . . ) is sequentially written into the image memory 180 as shown by Write in the left column in FIG. 4, and as shown by Read in the right column in FIG. 4, the image data is read out in the sequence of the second page image data, the fourth page image data, the sixth page image data, the first page image data, the third page image data, and the fifth page image data. That is, the image data is read out in the sequence of the reverse surfaces of 3 document sheets and the obverse surfaces of 3 document sheets. In this connection, in the case where images of reverse surfaces and obverse surfaces are formed for every n sheets, the image memory 180 provided with an area block for 2n sheets, may be prepared.

Further, as described above, in the case where the reverse surfaces and obverse surfaces for 3 document sheets are alternately read out, the image memory 180 is divided into 2 memory banks 181 and 182, and by alternately using these 2 memory banks, waiting time can be shortened. That is, when one memory data is written into either one memory bank, the other image data can be read out from the other memory bank.

Figure 4:
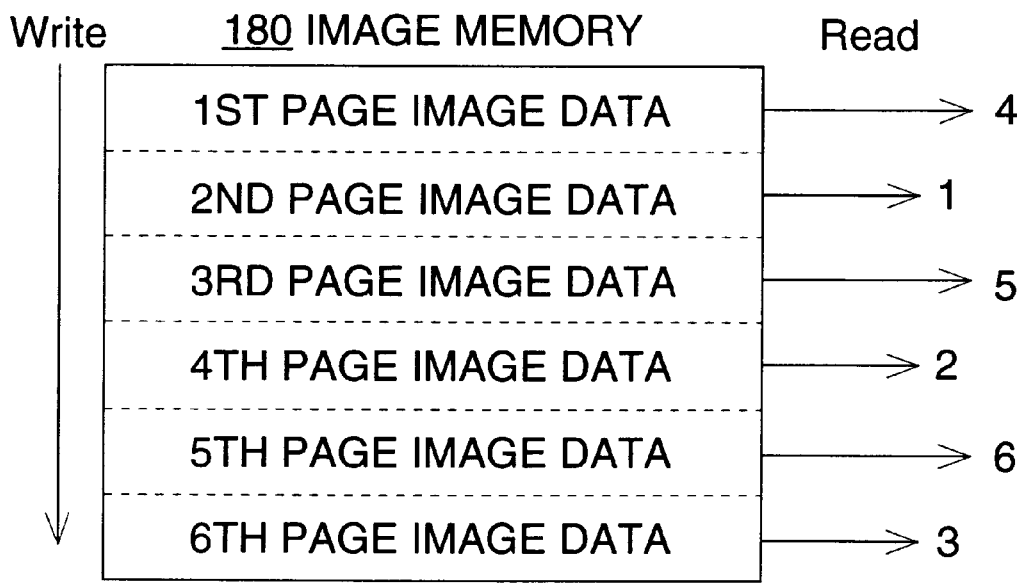
FIG. 4 is an illustration showing another example in the case where the reading sequence is changed, in the sequence of writing into and reading from an image memory.
Figure 5:
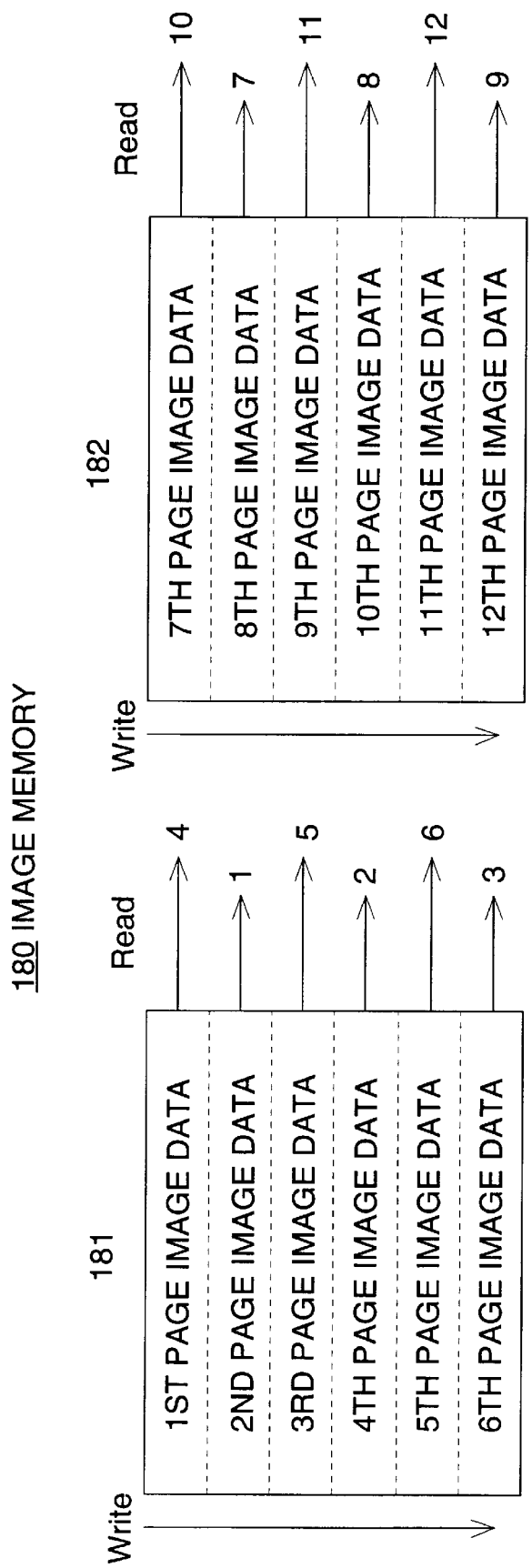
FIG. 5 is an illustration showing still another example in the case where the reading sequence is changed, in the sequence of writing into and reading from an image memory.
Figure 6:
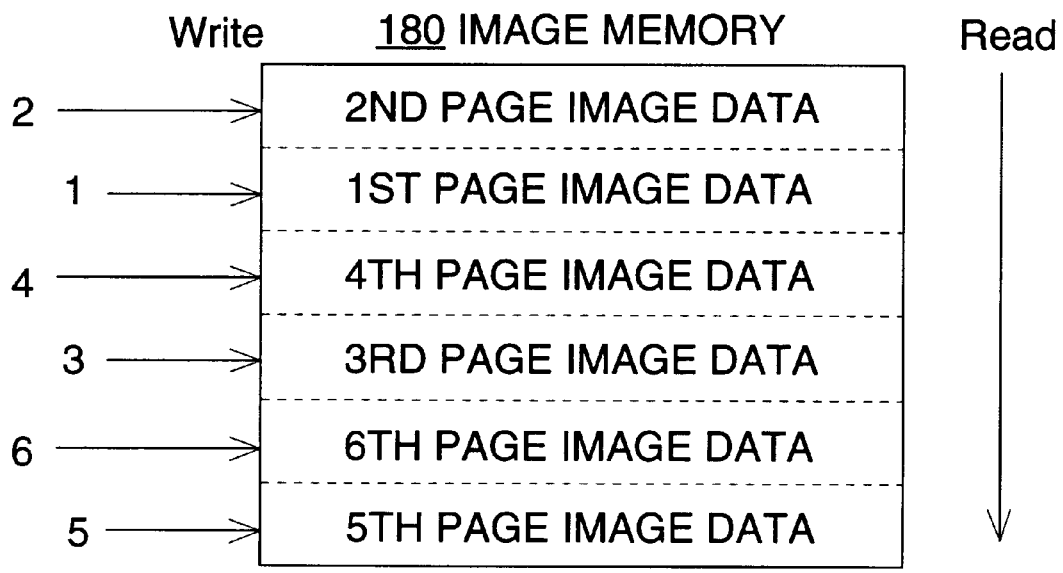
FIG. 6 is an illustration showing an example in the case where the writing sequence is changed, in the sequence of writing into and reading from an image memory.

Incidentally, even if the writing area is changed and the image data is successively read out from the leading area, the same operations as those shown in FIGS. 3 through 5, can be conducted. Herein, referring to FIGS. 6 through 8, relating to "write" and "read" in the image memory 180, the state in which the writing sequence is changed will be described.

In the ADF, reading is conducted in the sequence of the obverse surface of the first sheet, the reverse surface of the first sheet, the obverse surface of the second sheet, the reverse surface of the second sheet of the document, . . . The image data generated by such the reading is written into the image memory 180, as shown in Write in the left column in FIG. 6, in such the manner that the first page image data is written into the second area block, the second page image data is written into the first area block, the third page image data is written into the fourth area block, the fourth page image data is written into the third area block, Then, as shown by Read in the right column in FIG. 6, by reading out the image data sequentially from a leading address of the image memory 180, the image data is read out in the sequence of the second page image data, the first page image data, the fourth page image data, the third page image data, . . . That is, the image data is read out in the sequence of the reverse surface of the first sheet of the document, the obverse surface of the first sheet, the reverse surface of the second sheet, the obverse surface of the second sheet, . . .

Incidentally, according to the conveyance path length and the size of the transfer sheet material, the following may also be done: images of the reverse surfaces of 3 transfer sheet materials are formed at one time, and then, images of the obverse surfaces of the 3 transfer sheet materials are formed. In this case, the image formation is conducted as shown in FIG. 7.

Figure 7:
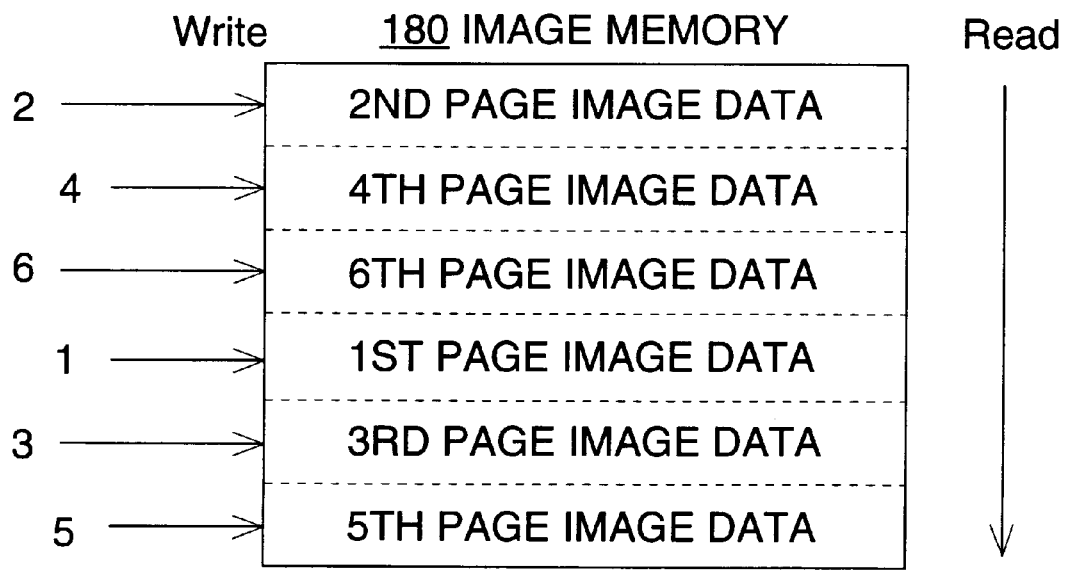
FIG. 7 is an illustration showing another example in the case where the writing sequence is changed, in the sequence of writing into and reading from an image memory.
Figure 8:
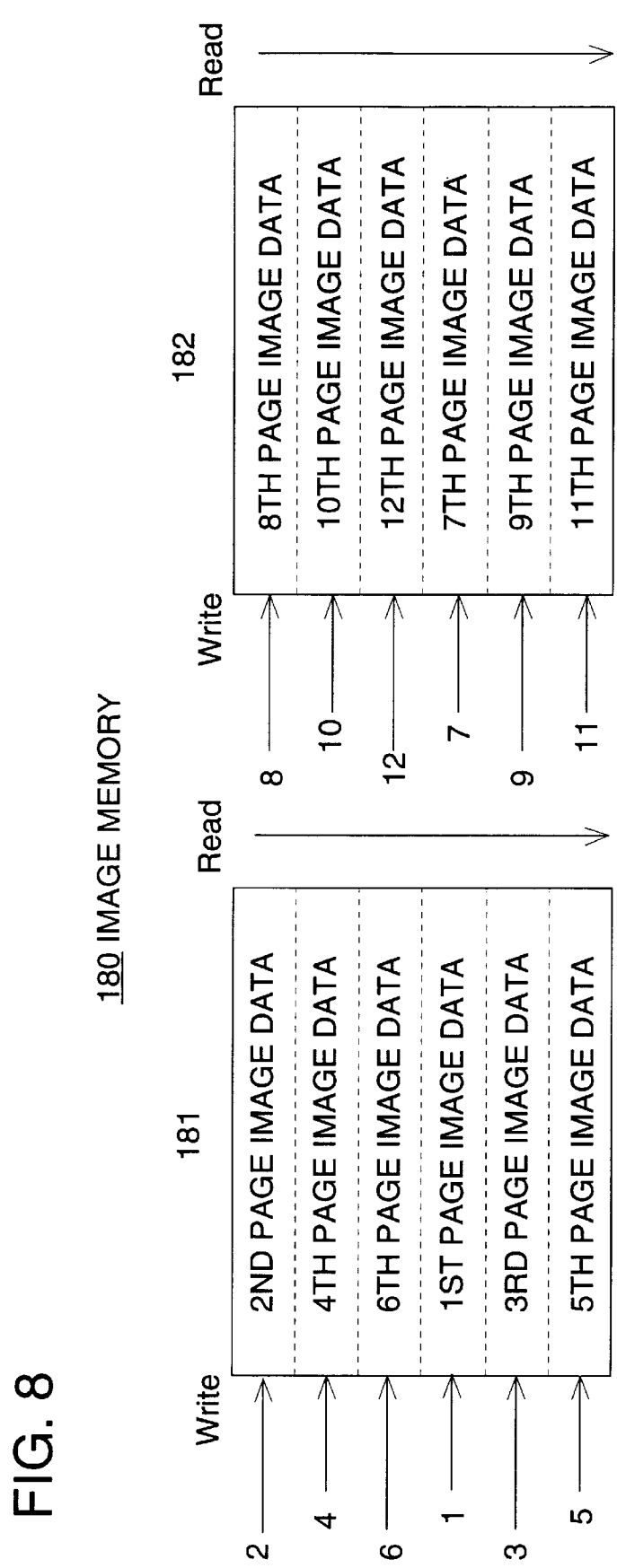
FIG. 8 is an illustration showing still another example in the case where the reading sequence is changed, in the sequence of writing into and reading from an image memory.

That is, the image data generated by reading-out is written into the image memory 180, as shown by Write in the left column in FIG. 7, in such the manner that the first page image data is written into the fourth area block, the second page image data is written into the first are block, the third page image data is written into the fifth area block, the fourth page image data is written into the second area block, the fifth page image data is written into the sixth area block, the sixth page image data is written into the third area block.

Then, as shown by Read in the right column in FIG. 7, by reading out the image data sequentially from a leading address of the image memory 180, the image data is read out in the sequence of the second page image data, the fourth page image data, the sixth page image data, the first page image data, the third page image data, and the fifth page image data. That is, the image data is read out in the sequence of the reverse surfaces for 3 document sheets and the obverse surfaces for 3 document sheets.

Further, as described above, in the case where the reverse surfaces and obverse surfaces for 3 document sheets are alternately read out, the image memory 180 is divided into 2 memory banks 181 and 182, and by alternately using these 2 memory banks, waiting time can be shortened. That is, when one memory data is written into either one memory bank, the other image data can be read out from the other memory bank.

Incidentally, as described above referring to FIGS. 6 through 8, a method in which the writing sequence into the image memory 180 is changed and the image data is read out in the order of addresses, is preferable from the viewpoint that the reading-out can be carried out normally, thereby the image forming speed can be increased.

Herein, referring to FIG. 9, the operation of the apparatus, by which the image is formed in the sequence of the reverse surface of the document and the obverse surface thereof, will be described together with the operation of the finisher 70.

Figure 9:
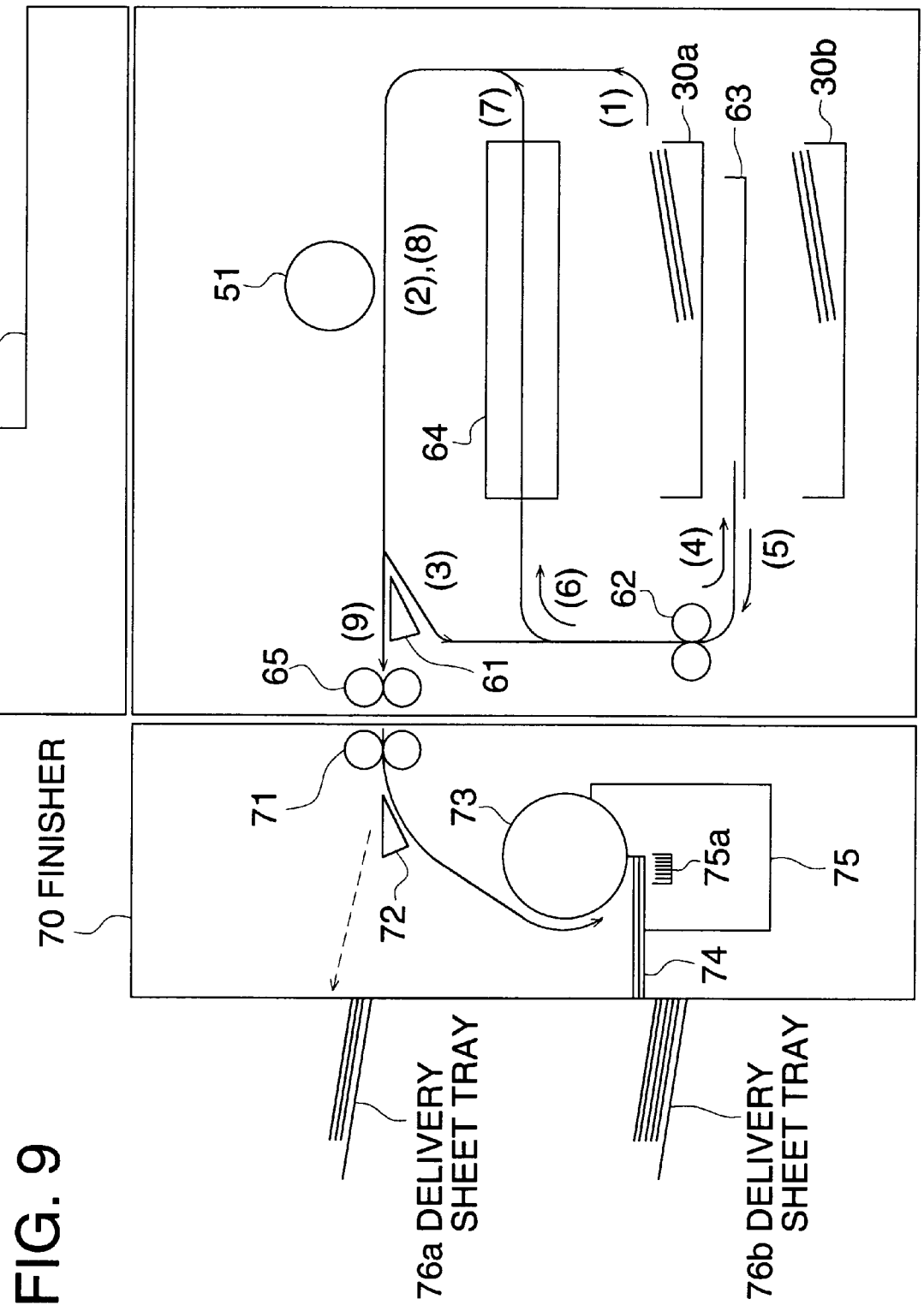
FIG. 9 is an illustration showing an example of a state of papering of a transfer sheet material in the case of two-sided copying.

The transfer sheet material p is fed from the sheet feed cassette 30a, and is sent to the image forming section 50 (FIG. 9(1)). The image data inputted from the recording image processing section 190 into the image writing section 40, is read out first in the sequence of the reverse surface of each document sheet, as shown in FIG. 3. Accordingly, the image of the second page of the document (the reverse surface of the first sheet of the document) is formed on the reverse surface of the transfer sheet material p (FIG. 9(2)).

The transfer sheet material p is conveyed downward through a guide 61 (FIG. 9(3)), and enters into a reverse section 63 (FIG. 9(4)). Next, the transfer sheet material p entered into the reverse section 63 is fed again by a reverse roller 62 (FIG. 9(5)), and sent again to the image forming section 50 (FIG. 9(7)) through a reverse conveying path 64 (FIG. 9(6)). In this condition, the obverse surface (the surface on which the image is not formed yet) is conveyed into the image forming section 50, and an image of the first page of the document (the obverse surface of the first sheet of the document) is formed (FIG. 9(8)). As described above, the transfer sheet material p on which image formation of the reverse surface and the obverse surface of the document has been completed, is delivered toward the finisher 70 with its surface facing upward (FIG. 9(9)).

Then, the transfer sheet material p is conveyed in the direction of the reverse conveyance drum 73 by the guide 71 through the roller 71 of the finisher 70, and is wound around the reverse conveyance drum 73 and reversed. That is, the obverse surface of the transfer sheet material p is made to face downward, and is placed on a sheet tray 74. When such the operation is successively conducted, the transfer sheet material p with its obverse surface facing downward is successively placed on the sheet tray 74. Then, the transfer sheet materials p are arranged in order for each copy volume by a stapling means 75, and are stapled by a needle 75a of the stapling means 75, and delivered onto the delivery sheet tray 76b.

Figure 10:
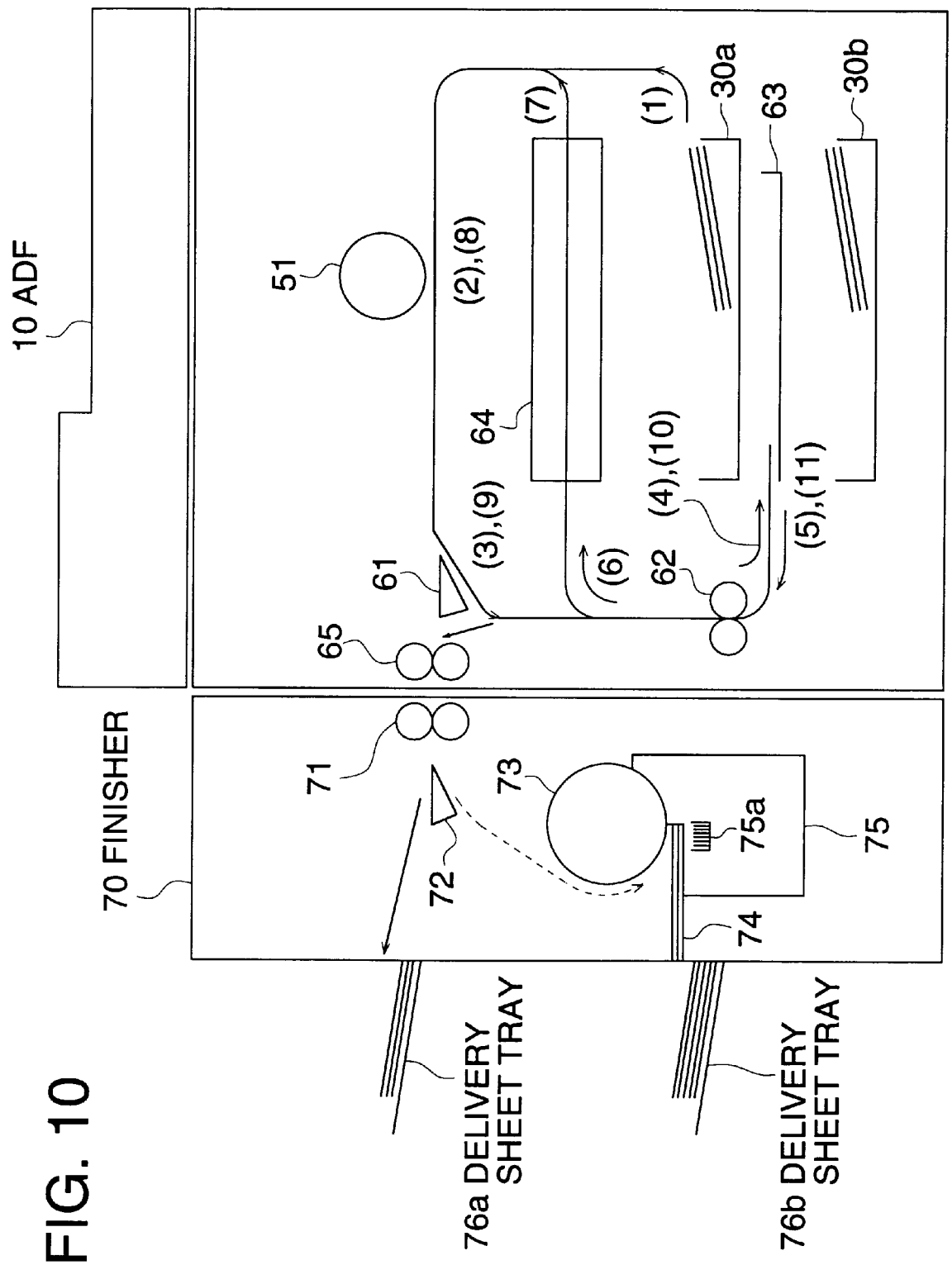
FIG. 10 is an illustration showing another example of a state of papering of a transfer sheet material in the case of two-sided copying.

Incidentally, when the reverse conveying drum 73 is not used and the transfer sheet material p is delivered onto the delivery sheet tray 76a without any additional operation, as shown in FIG. 10, the transfer sheet material p, in which image formation of both surfaces has been completed (FIG. 10(1) through (8)), is conveyed downward through the guide 61 (FIG. 10(9)), and enters into the reverse section 63 (FIG. 10(10)). The transfer sheet material p entered the reverse section 63 is fed again by the reverse roller 62 (FIG. 10(11)), and conveyed upward and delivered outside the apparatus through the guide 61 (FIG. 10(12)). Accordingly, the transfer sheet material p with its obverse surface facing downward is sequentially stacked on the delivery sheet tray 76a.

Figure 11:
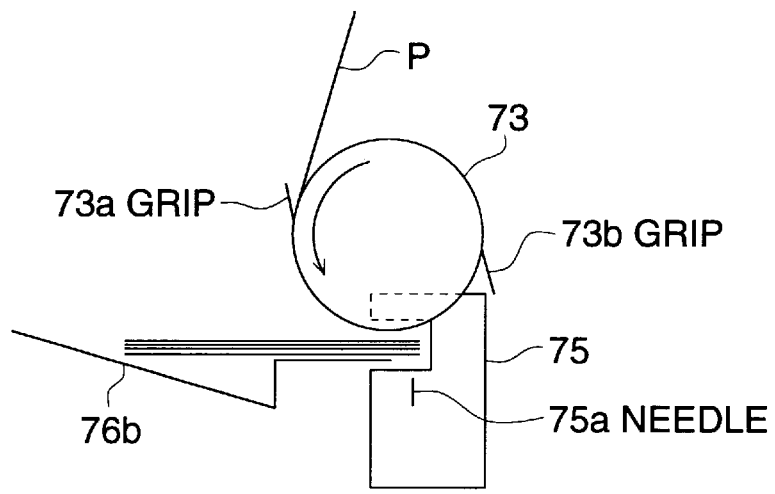
FIGS. 11(a) to 11(c) each is an illustration showing an example of a state of stapling processing.
Figure 11:
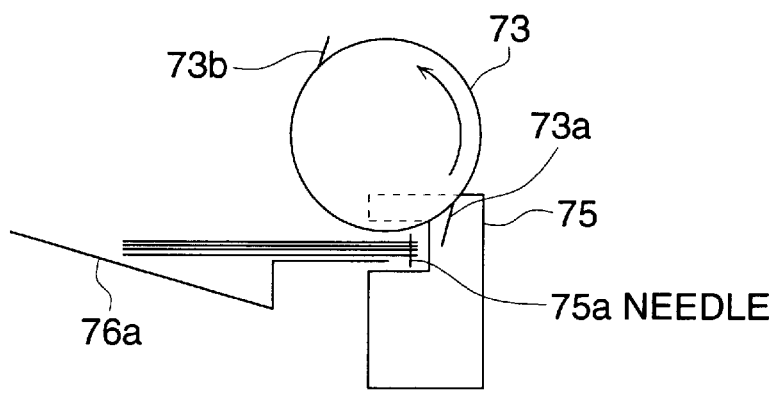
Figure 11:
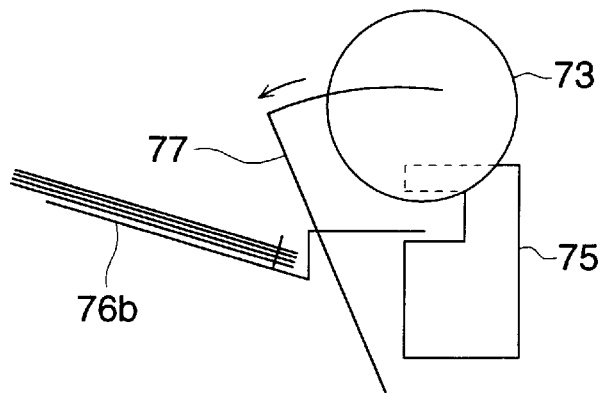

Herein, referring to FIG. 11, the state in which the transfer sheet material p reversed by the reverse conveying drum 73 is stapling processed, will be described.

The transfer sheet material p moving toward the reverse conveying drum 73 through the guide 72, is held by a grip 73a provided around the reverse conveying drum 73 (FIG. 11(a)). Then, the transfer sheet material is conveyed around the reverse conveying drum 73 with the rotation of the reverse conveying drum 73 while being held by the grip 73a.

Then, the transfer sheet material p is brought into contact with a contact surface, or the like, of the stapling means and separated from the reverse conveying drum 73, and its obverse surface facing upward is then turned to face down, and the transfer sheet material p is stacked (FIG. 11(b)). When the transfer sheet material p corresponding to the final page of the document is thus reversely conveyed, the transfer sheets p are stapled by the needle 75a of the stapling means 75. Then, the stapled transfer sheet materials p are delivered onto the delivery sheet tray 76b by a delivery arm 77.

Figure 12:
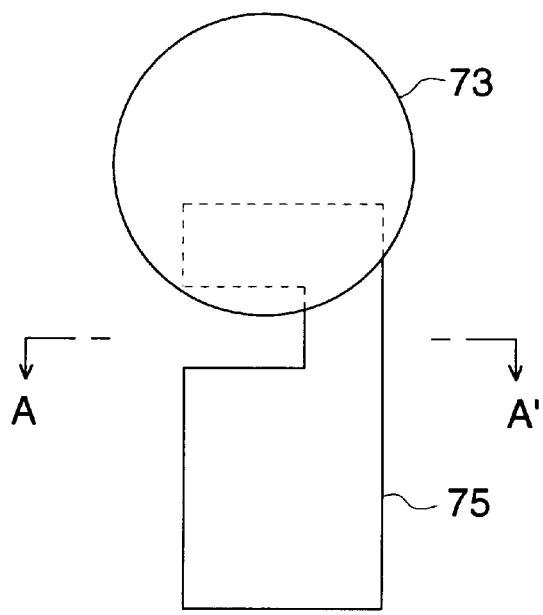
FIGS. 12(a) and 12(b) is an illustration showing a structure of a stapling means.
Figure 12:
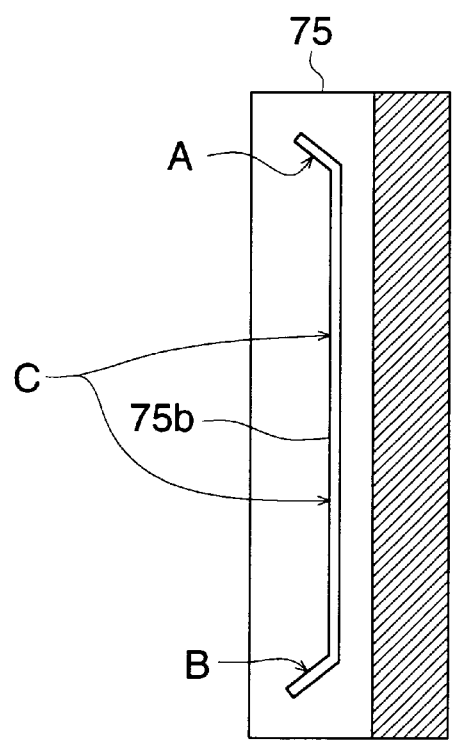

Incidentally, the stapling position in the stapling means 75 is shown in FIG. 12. FIG. 12(a) shows the state viewed from the side of the stapling means 75 and the reverse conveying drum 73, and a sectional view taken on line A–A' in FIG. 12(a) is shown in FIG. 12(b). Herein, numeral 75b typically shows an opening portion used when the needle 75a is driven into the transfer sheet materials p.

The stapling means 75 has a function to staple at only one of single end portions of the transfer sheet material, and in this case, a position A or B in FIG. 12(b) is a position of 1-position stapling (corner stapling), and a position C in FIG. 12(b) is a position of 2-position stapling (lateral stapling).

In this connection, in order to drive the needle 75a into such the position, the stapling mechanism is required to have either of a linear movement + an oscillating mechanism, or a movement along a rail having the shape of 75b.

Herein, a display and a selection of an icon (pictorial symbols) in the operation section 110 constituting the stapling position-selecting means will be described.

The operation section 110 comprises a display means (a liquid crystal display, or the like) which can display various images or icons, and a transparent touch panel provided on the surface of the display means. Accordingly, when the operator touches the displayed icon portion, a mode or an item corresponding to the icon is selected.

Figure 13:
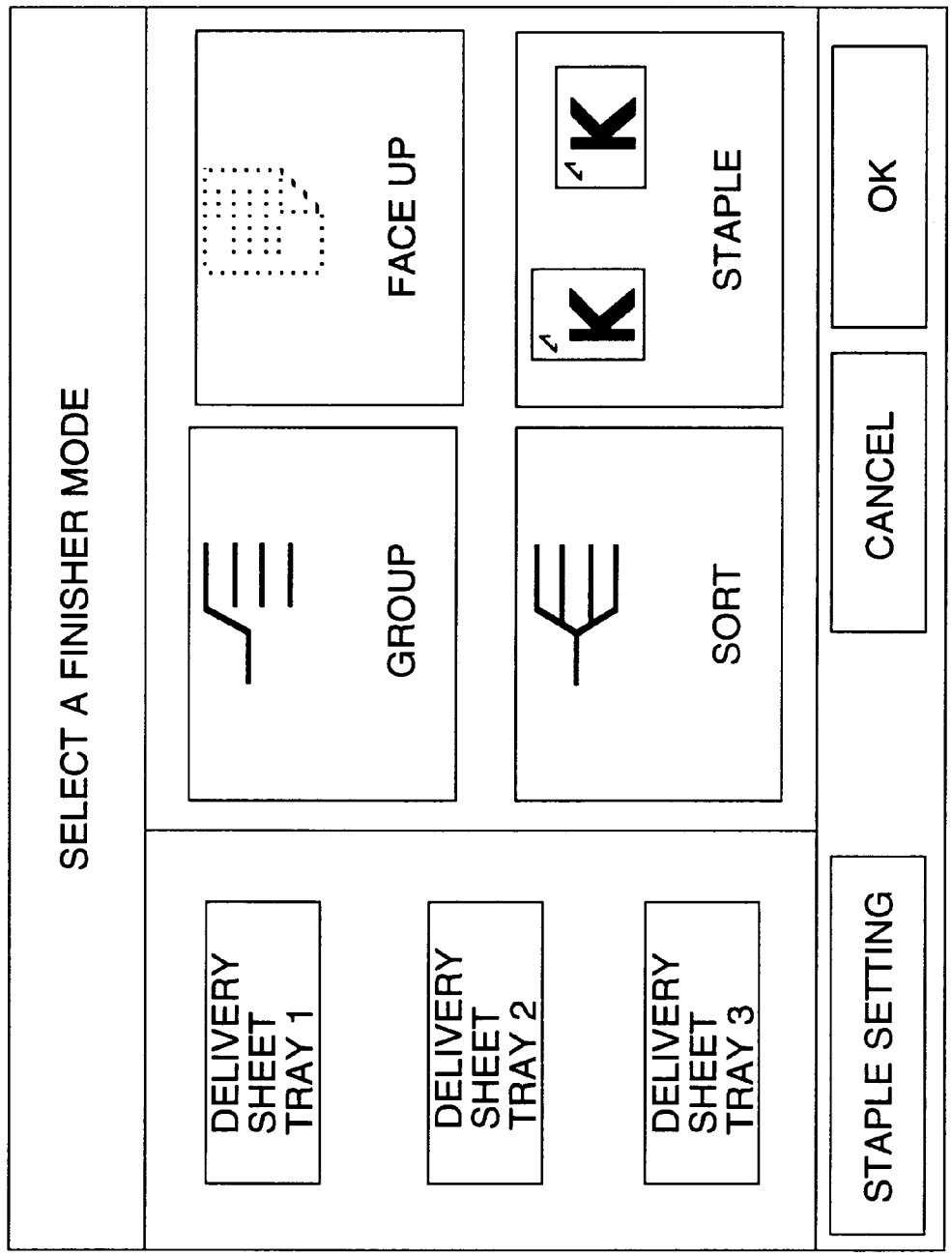
FIG. 13 is an illustration showing an example of a selection picture plane of a finisher mode in the operation section.

As operation modes of the finisher 70, the display shown in FIG. 13 is provided in the operation section 110, and is structured such that the selection of delivery sheet trays, the selection of any of group, face up, sorting, and stapling, and staple setting, can be made and set, and when cancel is selected, the operator is required to repeat the selection or setting, and when OK is selected, the selection or setting is decided.

Figure 14:
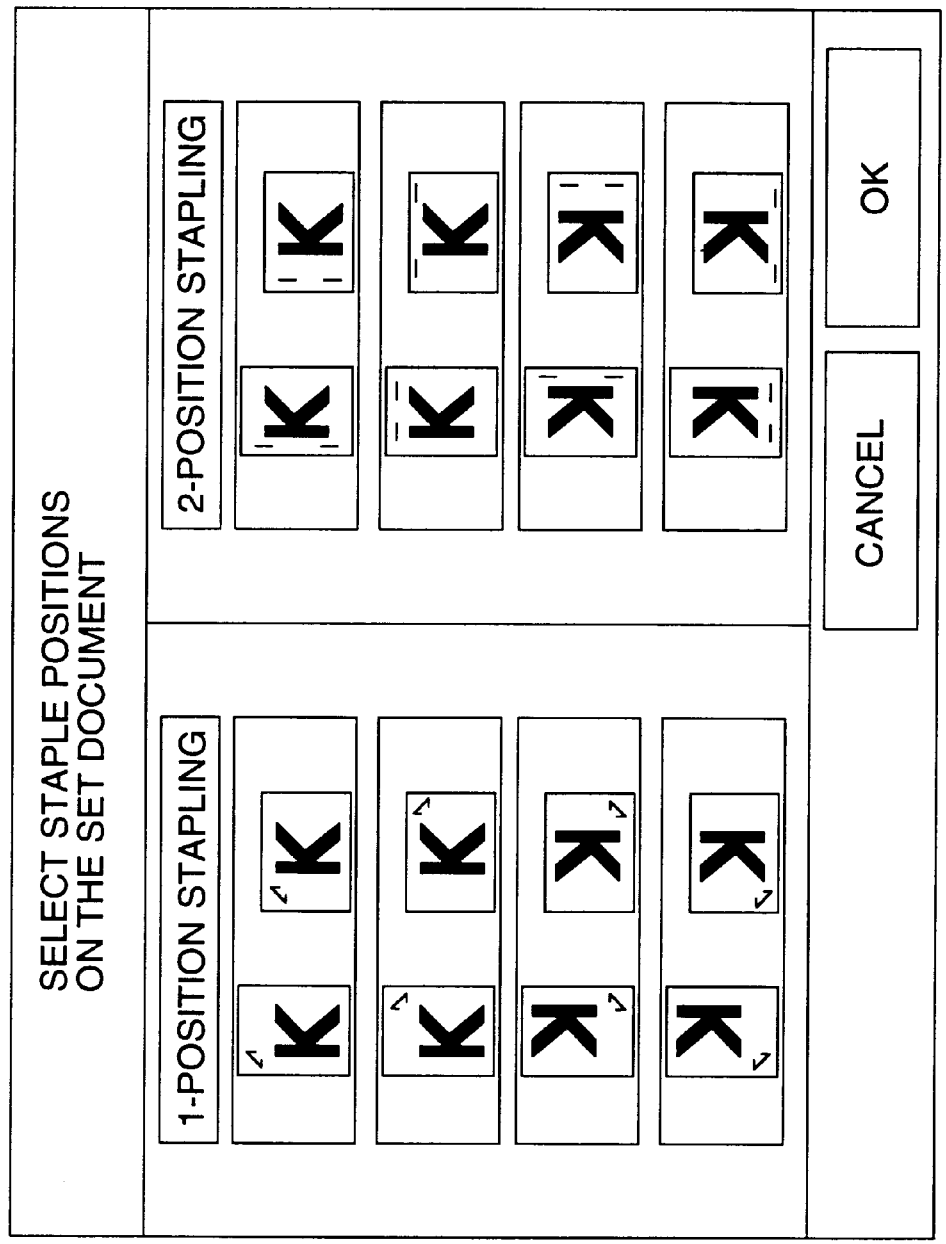
FIG. 14 is an illustration showing an example of a selection picture plane of stapling positions in the operation section.

Herein, when the icon of staple setting in FIG. 13 is selected, a picture plane of the stapling processing as shown in FIG. 14 is displayed in the operation section 110. On this picture plane of the stapling processing, the stapling position on the transfer sheet material p can be selected.

Herein, the operator compares the document on the document platen 11 of the ADF 10 with the icon in the operation section 110 with the eye, and can select the desired stapling position while visually grasping the position, corresponding to the direction of the document placement and the direction of characters.

Herein, the desired stapling position is any one of 4 corners of the document in the 1-position stapling (corner stapling), and any one of 4 sides of the document in the 2-position stapling (lateral stapling).

Further, in FIG. 14, portrait documents and landscape documents are shown for the 1-position stapling, and icons of 8 patterns are shown. However, stapling positions for the character on the document are divided into 4 patterns of the upper left of the character in the normal direction, the upper right of the character in the normal direction, the upper left of the character in the inverse direction, and the upper right of the character in the inverse direction.

In FIG. 14, portrait documents and landscape documents are shown for the 2-position stapling, and icons of 8 patterns are shown. However, stapling positions for the character on the document are divided into 4 patterns of the left side of the character in the normal direction, the upper side of the character in the normal direction, the left side of the character in the inverse direction, and the upper side of the character in the inverse direction.

According to such the classification, depending on the desired stapling position of the operator for the character on the document, the operator can easily conduct the selecting operation while visually grasping the position.

FIG. 15 shows the state of image processing in the case where, according to an arbitrary selected stapling position as shown in FIG. 14 in the operation section 110, stapling processing is conducted by the stapling means 75 provided with the function to staple on only a single end portion of the transfer sheet material as shown in FIG. 12. Herein, the left column of 2 aligned figures shows the selected stapling position, and the right column shows the state of the image rotation processing conducted on the image data read out from the image memory 180.

That is, the selected stapling position is any one of 4 corners or 4 sides of the document, however, stapling is actually conducted on only a single end portion of the transfer sheet material, and therefore, by conducting image rotation processing, the selected stapling position is made to coincide with the practicable stapling processing position.

For example, the stapling means in FIG. 12 is assumed that it can conduct 1-position stapling processing or 2-position stapling processing on only a position corresponding to the left side end portion of the document on the document platen 11.

Figures 15A, 15B:
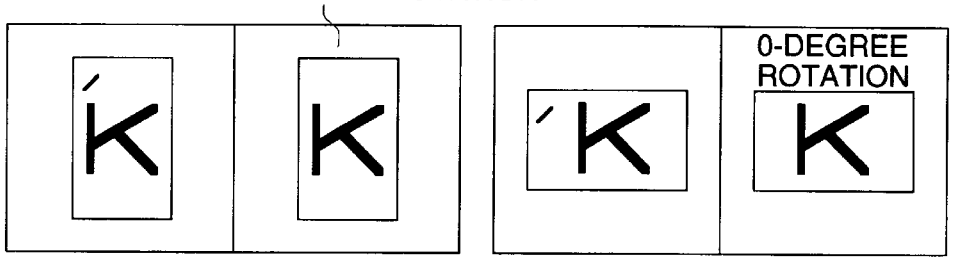
FIGS. 15(a) to 15(h) each is an illustration showing an example of a state of stapling positions of a selected one position stapling and the image rotation processing.

In this case, when the uppermost step (the upper left of the character in the normal direction) of the column of the 1position stapling in FIG. 14 is selected, the image formation is conducted in the state in which the image rotation processing is not conducted on the transfer sheet material in the same direction, as shown in FIG. 15(a) or FIG. 15b), and stapling processing is conducted.

Figures 15C, 15D:
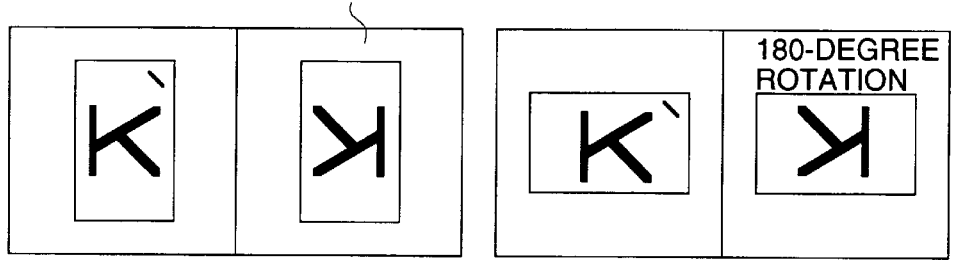

When the second step (the upper right of the character in the normal direction) of a column of the 1-position stapling in FIG. 14 is selected, the image formation is conducted in the state in which the image rotation processing of 180 degree is conducted on the transfer sheet material in the same direction, as shown in FIGS. 15(c) and 15(d), and stapling processing is conducted. According to this operation, the selected stapling position is made to coincide with the practicable stapling processing position.

Figures 15E, 15F:
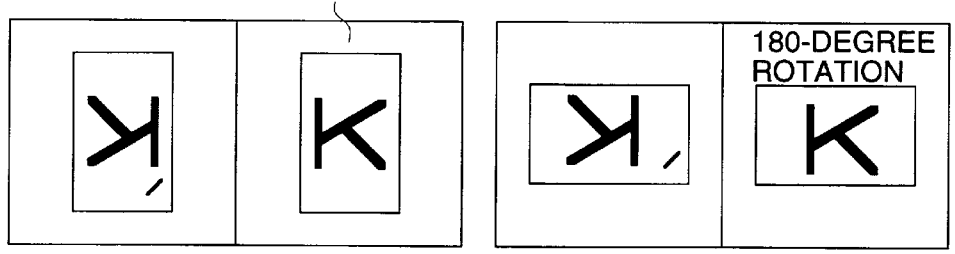

When the third step (the lower right of the character in the inverse direction) of the column of the 1-position stapling in FIG. 14 is selected, the image formation is conducted in the state in which the image rotation processing of 180 degree is conducted on the transfer sheet material in the same direction, as shown in FIGS. 15(e) and 15(f), and stapling processing is conducted. According to this operation, the selected stapling position is made to coincide with the practicable stapling processing position.

Figures 15G, 15H:
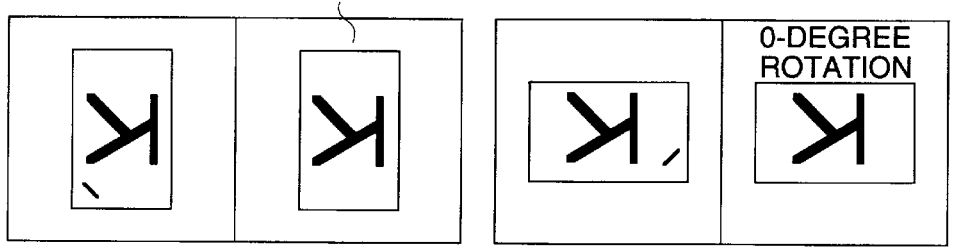

When the lowermost step (the lower left of the character in the inverse direction) of the column of the 1-position stapling in FIG. 14 is selected, the image formation is conducted in the state in which the image rotation processing is not conducted on the transfer sheet material in the same direction, as shown in FIGS. 15(g) and 15(h), and stapling processing is conducted.

Figure 16:
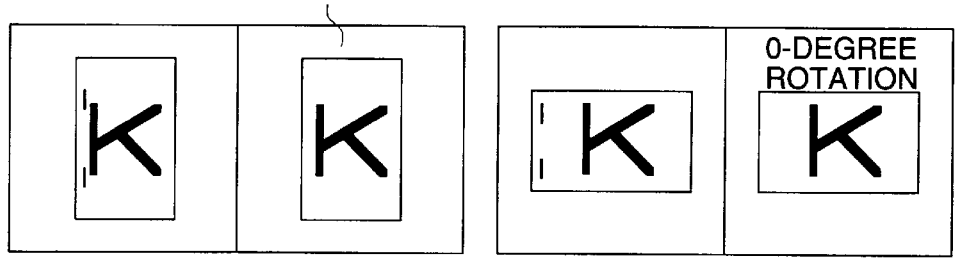
FIGS. 16(a) to 16(h) each is an illustration showing an example of a state of stapling positions of a selected two position stapling and the image rotation processing.
Figure 16:
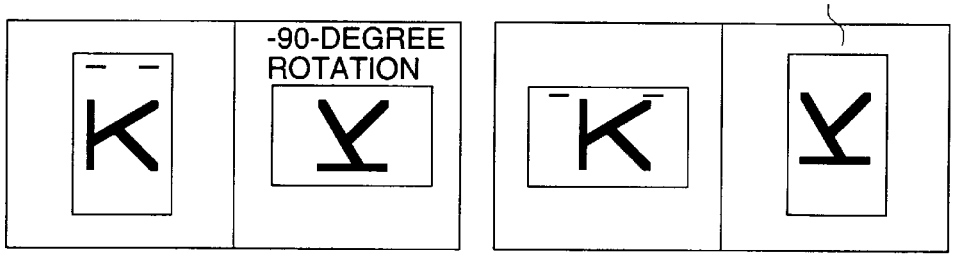
Figure 16:
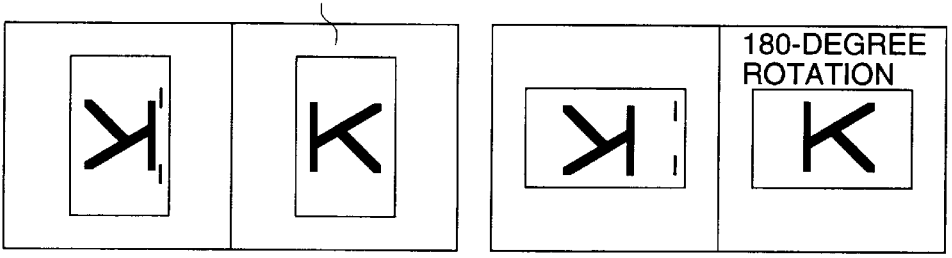
Figure 16:
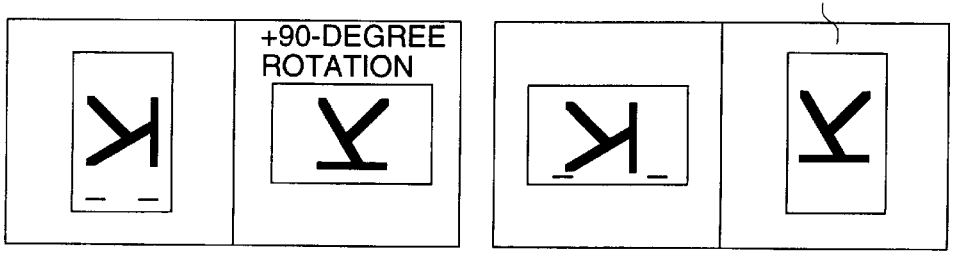

Further, when the uppermost step (the left side of the character in the normal direction) of the column of the 2-position stapling in FIG. 14 is selected, the image formation is conducted in the state in which the image rotation processing is not conducted on the transfer sheet material in the same direction, as shown in FIG. 16(a) or FIG. 16(b), and stapling processing is conducted.

When the second step (the upper side of the character in the normal direction) of the column of the 2-position stapling in FIG. 14 is selected, the image formation is conducted in the state in which the image rotation processing of −90 degree is conducted on the transfer sheet material in the different direction from the document, as shown in FIGS. 16(c) and 16(d), and stapling processing is conducted. According to this operation, the selected stapling position is made to coincide with the practicable stapling processing position.

When the third step (the right side of the character in the inverse direction) of the column of the 2-position stapling in FIG. 14 is selected, the image formation is conducted in the state in which the image rotation processing of 180 degree is conducted on the transfer sheet material in the same direction, as shown in FIGS. 16(e) and 16(f), and stapling processing is conducted. According to this operation, the selected stapling position is made to coincide with the practicable stapling processing position.

When the lowermost step (the lower side of the character in the inverse direction) of the column of the 2-position stapling in FIG. 14 is selected, the image formation is conducted in the state in which the image rotation processing of +90 degree is conducted on the transfer sheet material in the different direction from the document, as shown in FIGS. 16(g) and 16(h), and stapling processing is conducted.

According to this operation, the selected stapling position is made to coincide with the practicable stapling processing position.

Incidentally, when the actual stapling processing position is different from the case described above, the image rotation processing may be changed so as to coincide with the stapling processing position. Further, the control is conducted by the reading control section 140 or the recording control section 150, according to the designation of the mode analysis section 120 selected by the operation section 110, and the image rotation processing as described above may be conducted by either of the reading image processing section 170 or the recording image processing section 190.

When the rotation processing of +90 degree or −90 degree is conducted on the document image, a signal is transmitted from the mode analysis section 120 to the control section, not shown, and a sheet feed cassette in which a desired transfer sheet material whose direction coincides with the direction of the recording image, is accommodated, is selected among a plurality of sheet feed cassettes by the control section, and the transfer sheet material is fed from the cassette.

At this time, when the size of documents is detected by APS, a cassette storing recording sheets whose size corresponds to the size of documents and orientation is rotated by 90 degrees from the orientation of the document, is selected and the recording sheets are fed from the selected cassette. That is, for example, even if the size of document is detected as "A4" by APS, the size of the recording sheets is determined as "A4R". On the other hand, when the image data are rotated by 180 degrees, the recording sheets whose size and orientation correspond to the size and the orientation of the documents are selected and fed from the cassette.

As detailed above, when the image rotation processing is used, an image forming apparatus can be realized, which can conducts stapling processing at any position of 4 corners or 4 sides of the transfer sheet material, by a simple structure to conduct stapling processing on only a single end portion of the transfer sheet material.

Further, an image forming apparatus can be realized in which, by referring to icons on the operation section 110, the selection, at which position on the document placed on the ADF 10 the stapling is conducted, can be easily grasped visually and conducted.

In the above embodiment, an example in the case of two-sided document reading—two-sided image formation is described, however, the present invention is not limited to this example. Every kind of image formation modes such as single-sided document—two-sided image formation, or twosided document—single-sided image formation, can be set. In this case, setting of the mode can be conducted from the operation section 110.

Further, in the above embodiment, an example in which the present invention is applied to a monochromatic image forming apparatus, is described, however, the present invention is not limited to this example, but can also be applied to a color image forming apparatus.

Further, in the above embodiment, an example of a copier provided with an automatic document reading means is described, however, the present invention is not limited to the example, but can also be applied to an image forming apparatus such as a printer which receives image data from outside the apparatus.

Further, other positions than the above described stapling positions (any one of 4 corners, 2 positions of any one of 4 sides), or a plurality of stapling positions more than 3 positions can also be selected on the single end portion of the document. Even when such the selection is made, it can be met by the image rotation processing.

As detailed above, according to the present invention, the following effects can be obtained.

In the invention described in Item 1, the image processing is conducted so that the stapling position on the transfer sheet material selected by the stapling position-selecting means coincides with a position at which the post processing means can staple (only one of single end portions of the transfer sheet material), therefore, the post processing means can conduct stapling processing at any position of 4 corners or 4 sides of the transfer sheet material, by a simple structure in which stapling is conducted at only one of single end portions of the transfer sheet material.

In the invention described in Item 2, the stapling position of the selected transfer sheet material is made to coincide with a position at which the post processing means conduct the stapling, by adjusting the direction of the image on the transfer sheet material by the image rotation processing of 180 degree, therefore, the post processing means can conduct stapling processing at any position of 4 corners or 4 sides of the transfer sheet material, by a simple structure in which stapling is conducted at only one of single end portions of the transfer sheet material.

In the invention described in Item 3, either of the image rotation processing of the −90 degree rotation or that of +90 degree rotation is conducted so that the stapling position on the transfer sheet material selected by the stapling position-selecting means coincides with a position at which post processing means can conduct stapling (only one of single end portions of the transfer sheet material). In this connection, when the image rotation processing of −90 degree and +90 degree is conducted, the control means supplies the transfer sheet material in the direction different by 90 degree from the direction of the document to the image forming means, as the result, the post processing means can conduct stapling processing at any position of 4 corners or 4 sides of the transfer sheet material, by a simple structure in which stapling is conducted at only one of single end portions of the transfer sheet material.

In the invention described in Item 4, any of the image rotation processing of the −90 degree rotation, +90 degree rotation, or 180 degree rotation is conducted so that the stapling position on the transfer sheet material selected by the stapling position-selecting means coincides with a position at which post processing means can conduct stapling (only one of single end portions of the transfer sheet material). In this connection, when the image rotation processing of −90 degree and +90 degree is conducted, the control means supplies the transfer sheet material in the direction different by 90 degree from the direction of the document to the image forming means, as the result, the post processing means can conduct stapling processing at any position of 4 corners or 4 sides of the transfer sheet material, by a simple structure in which stapling is conducted at only one of single end portions of the transfer sheet material.

In the invention described in Item 5, a desired stapling position corresponding to the placed document (the direction of the sheet, the direction of the character on the document) is displayed as the choice of a plurality of pictorial symbols, thereby, relating to the choice at which position stapling is conducted on the document placed on the automatic document reading means, the stapling position can be easily understood visually and selected, by visually comparing the document with the display of pictorial symbols.

What is claimed is:

1. An image forming apparatus, comprising:
    an automatic document feeding device having a feeding stand on which documents are placed and automatically and successively fed therefrom;
    an image reading section for reading an image on an image surface of a document fed by the automatic document feeding device, and for outputting image data corresponding to the read image;
    an image processing section for processing the image data;
    an image forming section for successively forming images on sheets based on the processed image data;
    a post processing device having a stapling stand on which the sheets are placed, and a stapler for stapling the sheets at a predetermined position on the stapling stand at only a single side of the sheets; and
    a stapling position-selector, having a display on which a plurality of stapling illustrations are displayed, each of which indicates a stapling position relative to both of an orientation of a document and an orientation of an image on the document, for selecting one of the plurality of stapling illustrations;
    wherein the image processing section processes the image data so that when the sheets are placed on the stapling stand and the stapler staples the sheets at the predetermined position on the stapling stand, the stapled position with respect to the images formed on the sheets coincides with the stapling position on the document in the selected one of the plurality of stapling illustrations.

2. The image forming apparatus of claim 1, wherein the image processing section processes the image data so as to rotate an orientation of the images formed on the sheets.

3. The image forming apparatus of claim 2, wherein the image processing section rotates the orientation of the images formed on the sheets by 180 degrees.

4. The image forming apparatus of claim 1, wherein the image processing section rotates an orientation of the images formed on the sheets by +90 degrees or −90 degrees.

5. The image forming apparatus of claim 4, further comprising:

a control section for controlling an orientation of the sheets so as to coincide with the orientation of the images formed on the sheets;

wherein when the image processing section rotates the orientation of the images formed on the sheets by +90 degrees or −90 degrees, the control section rotates the orientation of the sheets by 90 degrees from the orientation of the documents.

6. The image forming apparatus of claim 1, further comprising:

a control section for controlling an orientation of the sheets so as to coincide with the orientation of the images formed on the sheets;

wherein the image processing section rotates an orientation of the images formed on the sheets by 180 degrees, +90 degrees, or −90 degrees; and wherein when the image processing section rotates the orientation of the images formed on the sheets by +90 degrees or −90 degrees, the control section rotates the orientation of the sheets by 90 degrees from the orientation of the documents, and when the image processing section rotates the orientation of the images formed on the sheets by 180 degrees, the control section causes the orientation of the sheets to coincide with the orientation of the documents.

7. The image forming apparatus of claim 1, wherein the automatic document feeding device is adapted to receive the documents with their image surfaces facing upward.

* * * * *